US008894092B2

(12) United States Patent
Hayashi et al.

(10) Patent No.: US 8,894,092 B2
(45) Date of Patent: Nov. 25, 2014

(54) AIRBAG DEVICE

(75) Inventors: Shinji Hayashi, Tokyo (JP); Yutaka Kitaike, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 14/006,790

(22) PCT Filed: Mar. 21, 2012

(86) PCT No.: PCT/JP2012/057095
§ 371 (c)(1),
(2), (4) Date: Sep. 23, 2013

(87) PCT Pub. No.: WO2012/133010
PCT Pub. Date: Oct. 4, 2012

(65) Prior Publication Data
US 2014/0015231 A1 Jan. 16, 2014

(30) Foreign Application Priority Data
Mar. 30, 2011 (JP) .................................. 2011-075199

(51) Int. Cl.
*B60R 21/16* (2006.01)
*B60R 21/217* (2011.01)
*B60R 21/205* (2011.01)

(52) U.S. Cl.
CPC .............. *B60R 21/217* (2013.01); *B60R 21/205* (2013.01)
USPC ....... 280/728.2; 280/732; 280/731; 280/728.3

(58) Field of Classification Search
USPC ............................. 280/728.2, 728.3, 731, 732
See application file for complete search history.

(56) References Cited

U.S. PATENT DOCUMENTS

| 5,851,023 | A | * | 12/1998 | Nagata et al. | ............... | 280/728.3 |
| 6,419,261 | B1 | * | 7/2002 | Ibe | ............... | 280/728.2 |
| 6,422,590 | B1 | * | 7/2002 | Umezawa et al. | ......... | 280/728.2 |

(Continued)

FOREIGN PATENT DOCUMENTS

| JP | H07-291070 A | 11/1995 |
| JP | H08-192706 A | 7/1996 |

(Continued)

OTHER PUBLICATIONS

International Search Report from the International Bureau of WIPO for International Application No. PCT/JP2012/057095 dated Jul. 3, 2012 (4 pages).

*Primary Examiner* — Nicole Verley
*Assistant Examiner* — Darlene P Condra
(74) *Attorney, Agent, or Firm* — Fitch Even Tabin & Flannery, LLP

(57) ABSTRACT

An airbag device capable of preventing a fish-mouth phenomenon and reducing the weight of a retainer is provided. The inner case has a plurality of holding holes for holding the retainer. The retainer has a bottom surface portion for supporting an airbag and an inflator, a side wall portion that is disposed at the outer periphery of the bottom surface portion and that has a height set to H so that the side wall portion hardly receives a pressure of the airbag when the airbag is inflated and developed, and engagement members that are disposed on the side wall portion and that are engageable with the holding holes. The substantially entirety of the retainer is housed in the inner case when the engagement members are engaged with the holding holes.

9 Claims, 9 Drawing Sheets

(56) References Cited

U.S. PATENT DOCUMENTS

| | | | |
|---|---|---|---|
| 6,431,582 B1* | 8/2002 | Ennis et al. | 280/728.2 |
| 6,435,548 B2* | 8/2002 | Suzuki et al. | 280/732 |
| 7,311,324 B2* | 12/2007 | Okada et al. | 280/728.2 |
| 7,407,180 B2* | 8/2008 | Yokoyama et al. | 280/728.2 |
| 2002/0063415 A1* | 5/2002 | Uchiyama et al. | 280/728.2 |
| 2007/0052217 A1* | 3/2007 | Miyata | 280/730.1 |
| 2007/0205591 A1* | 9/2007 | Bito | 280/743.2 |
| 2008/0012277 A1* | 1/2008 | McFarland et al. | 280/736 |
| 2009/0250910 A1* | 10/2009 | Tsujimoto | 280/728.2 |

FOREIGN PATENT DOCUMENTS

| | | |
|---|---|---|
| JP | H09-020202 A | 1/1997 |
| JP | H11-321510 A | 11/1999 |
| JP | 2000-326813 A | 11/2000 |
| JP | 2001-097162 A | 4/2001 |
| JP | 2003-306113 A | 10/2003 |
| JP | 2004-098710 A | 4/2004 |
| JP | 2004-161182 A | 6/2004 |
| JP | 2005-096560 A | 4/2005 |
| JP | 2005-280630 A | 10/2005 |
| JP | 3822578 B2 | 6/2006 |

* cited by examiner

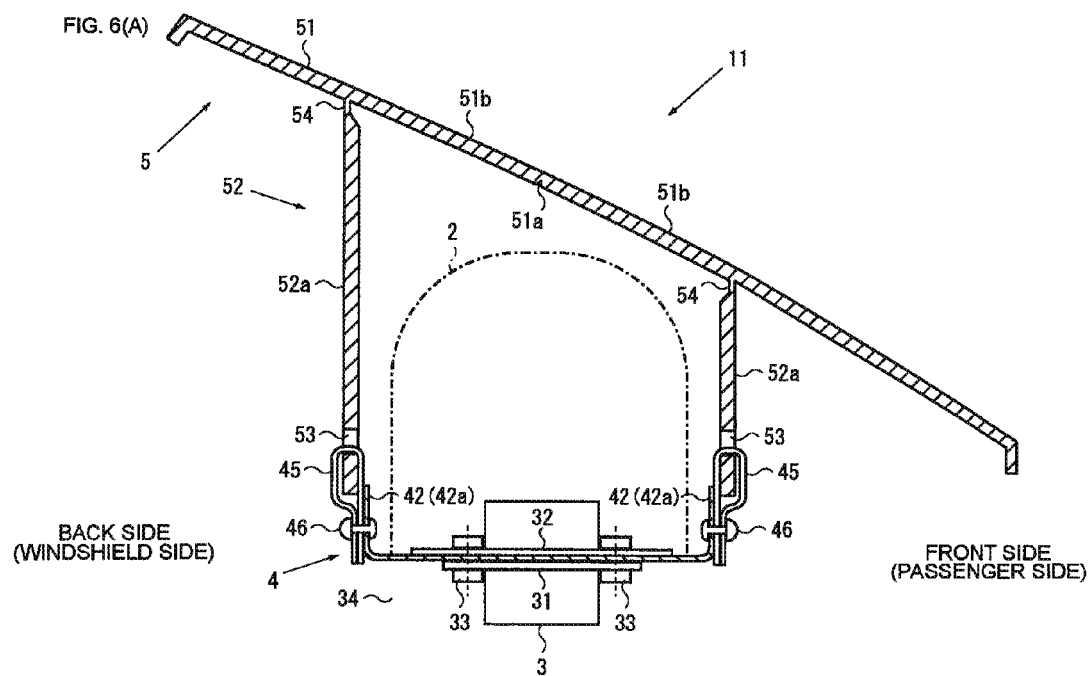
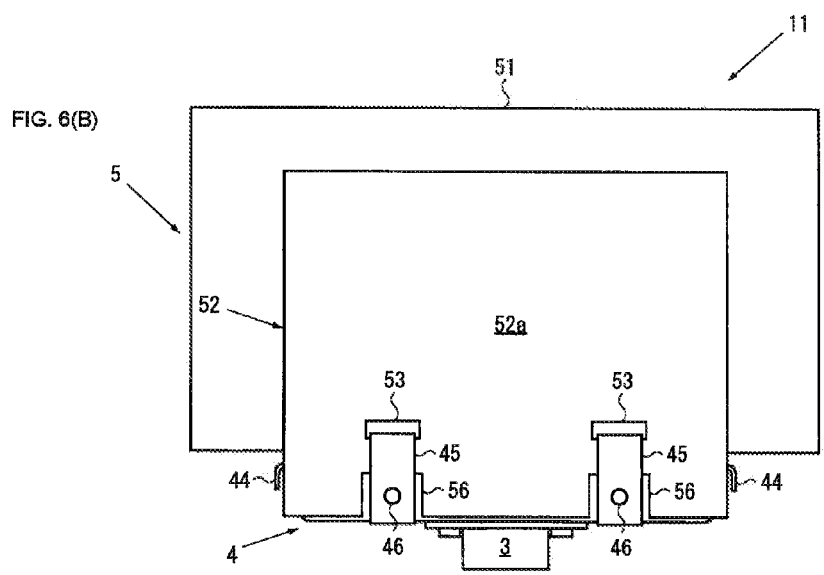

AIRBAG DEVICE

CROSS-REFERENCE TO RELATED APPLICATIONS

This application is a U.S. national phase application filed under 35 U.S.C.§371 of International Application PCT/JP2012/057095, filed on Mar. 21, 2012, designating the United States, which claims priority from Japanese Patent Application No. 2011-075199, filed Mar. 30, 2011, which are hereby incorporated herein by reference in their entirety.

TECHNICAL FIELD

The present invention relates to an airbag device and, in particular, to an airbag device capable of preventing deformation of a retainer during inflation and deployment of an airbag.

BACKGROUND ART

In general, vehicles, such as motor vehicles, have an airbag device mounted therein. The airbag is inflated and deployed inside the vehicle to absorb an impact force applied to an occupant in emergency, such as collision or sudden deceleration. Such an airbag device generally includes an airbag that is normally folded and is inflated and deployed in emergency, an inflator for supplying gas to the airbag, a retainer for fixing the airbag and the inflator, and an airbag cover that covers the airbag.

In case of collision of the vehicle and sudden deceleration, gas is supplied from the inflator to the airbag and, thus, the airbag is inflated. Accordingly, the airbag cover is torn open and, thus, the airbag is released into the interior of the vehicle and is further inflated and deployed. In particular, a passenger airbag is inflated and deployed inside a space formed by an instrument panel, a windshield (a front window), and a passenger.

Note that in general, the retainer is made of a metallic material in order to withstand mechanical shock occurring when the airbag is inflated and deployed or the passenger collides with the airbag (refer to, for example, Japanese Unexamined Patent Application Publication No. 2001-097162 A). In an airbag device described in Japanese Unexamined Patent Application Publication No. 2001-097162 A, a retainer made from a sheet metal is fixed to part of the instrument panel using an attachment bolt.

In addition, in order to reduce the weight of a retainer, part of the retainer is made of a synthetic resin (refer to, for example, Japanese Unexamined Patent Application Publication No. 2000-326813 A). In an airbag device described in Japanese Unexamined Patent Application Publication No. 2000-326813 A, a retainer lower that supports an inflator is made of metal, and a retainer upper that supports an airbag is made of a synthetic resin. The retainer lower is fixed to the retainer upper using a bolt. By fitting a protrusion into an airbag cover (a lid), the retainer upper is fixed to the airbag cover. By employing such a structure, the weight of the retainer is reduced due to the retainer upper, and a shock is absorbed by the retainer lower.

As described above, in general, the retainer is fixed to the instrument panel or the airbag cover by using a fastener, such as a rivet or a bolt, or by fitting a protrusion into the instrument panel or the airbag cover. In recent years, as described in Japanese Patent No. 3822578 B2, in many cases, by relatively movably engaging a hook provided on a retainer with an opening formed in an airbag cover (a lid), the retainer is located in a floating manner. Such a structure reduces a shock of the airbag. In addition, the structure facilitates an assembling operation.

SUMMARY OF INVENTION

The above-described retainer has a box-like shape having a rectangular open top. An inflator and an airbag are fixed to the bottom surface of the retainer. Accordingly, when the airbag is inflated and deployed, the airbag having gas supplied from the inflator is inflated and deployed from the bottom surface of the retainer and, thus, presses a side wall of the retainer. As a result, the opening in the top surface of the retainer is deformed into an elliptical shape. In addition, since in general, the airbag cover (the lid) is formed of synthetic resin, the airbag cover is easily deformed by an inflating pressure of the airbag. Accordingly, when the retainer is connected to the airbag cover, the opening in the upper surface of the retainer is deformed into an elliptical shape by the deformation of the airbag cover.

In general, such deformation is referred to as "fish-mouth phenomenon". When designing a retainer, a solution to the fish mouth phenomenon problem is needed. In existing metal retainers, to solve the fish mouth phenomenon problem, the strength and rigidity of a retainer are increased by increasing the thickness of a plate or adding a reinforcing member to the plate. However, such a solution to the fish mouth phenomenon problem increases the weight of the retainer and, thus, it is difficult to reduce the weight of the airbag device, which is problematic.

Alternatively, to reduce the weight, a resin retainer or a metal retainer subjected to only bending and raising may be employed. However, the strength of such a retainer is insufficient to solve the fish mouth phenomenon problem and, thus, practical use of the retainer is difficult, which is problematic.

Accordingly, the present invention provides an airbag device capable of reducing the fish mouth phenomenon and reducing the weight of a retainer.

According to the present invention, an airbag device includes an airbag that is normally folded and is inflated and deployed in emergency, an inflator for supplying gas to the airbag, a retainer for fixing the airbag and the inflator, and an airbag cover for housing the airbag. The airbag cover includes a plate portion that forms an interior surface of a vehicle and an inner case that is disposed on a back surface of the plate portion and that forms an inflation and deployment path of the airbag. The inner case has a plurality of holding holes for holding the retainer. The retainer has a bottom surface portion for supporting the airbag and the inflator, a side wall portion that is disposed at the outer periphery of the bottom surface portion and that has such a height that the bottom surface hardly receives a pressure of the airbag when the airbag is inflated and deployed, and engagement members that are disposed on the side wall portion and that are engageable with the holding holes. The substantially entirety of the retainer is housed in the inner case when the engagement members are engaged with the holding holes.

The height of the side wall portion may be set within a range in which the height does not exceed a line segment connecting a fixed point of the airbag located in the bottom surface portion and a contact point located between the airbag during an inflation and deployment time and the inner case.

The holding holes may be formed in each of two wall surfaces that face each other in a substantially front-rear direction of the vehicle or each of two wall surfaces that form the inner case in the longitudinal direction. The inner case may have a supporting hole formed in each of two wall surfaces that face each other in a substantially right-left direction of the vehicle or each of two wall surfaces that form the inner case in the short direction, and the retainer may include a second engagement member that is engageable with the supporting holes.

The engagement member may be a holding belt formed in a circular shape by being inserted into a hook formed in the retainer or the holding hole and being connected to the retainer. In addition, the holding belt may be formed from one of webbing that is used for a seat belt and a belt-like fabric having such strength that the fabric withstands a force and a shock generated when the airbag is inflated and deployed. For example, the holding belt is fixed to the retainer from the outside by using a rivet.

A fixing portion of the retainer for fixing the holding belt may include a raised portion that expands outwardly so that part of a fixing member for fixing the holding belt does not protrude inwardly beyond the side surface portion on which the fixing portion is disposed. The inner case may have a notch formed so as not to interfere with the raised portion.

The retainer may be formed of resin. The retainer may have an inflator insertion opening formed in the bottom surface portion, a plurality of inflator fixing attachment holes formed at the outer periphery of the inflator insertion opening, and a plurality of bracket fixing attachment holes formed outside the inflator fixing attachment holes. A back plate having the inflator insertion opening, the inflator fixing attachment holes, and the bracket fixing attachment holes is disposed on the inner surface of the bottom surface portion. The inflator and the bracket may be fixed to the retainer by connecting the inflator and the bracket to the back plate so that the bottom surface portion is clamped.

According to the airbag device of the present invention, by setting the height of the side wall portion to such a height that the side wall portion does not receive a pressure generated when the airbag is inflated and deployed, deformation of the opening of the retainer caused by the inflation and deployment of the airbag can be reduced. In addition, when the airbag is inflated and deployed, excess load is not applied to the retainer. Accordingly, high strength and rigidity are not required and, thus, the retainer can be formed from a thin-walled metal material or a resin material. In addition, a reinforcement member can be reduced. As a result, a fish-mouth phenomenon can be prevented, and the weight of the retainer can be reduced. Furthermore, by housing the substantially entirety of the retainer in the inner case, formation of a gap between the inner case and the retainer can be prevented even when the inner case is deformed when the airbag is inflated and developed. Thus, protrusion of the airbag can be prevented.

In addition, by setting the height of the side wall portion within a range in which the height does not exceed a line segment connecting a fixed point and a contact point of the airbag, the side wall portion of the retainer can be formed within a range corresponding to a dead corner when the airbag is inflated and deployed. Accordingly, the contact area with the airbag can be effectively reduced and, thus, the side wall portion hardly receive the pressure of the airbag.

Furthermore, in addition to the engagement member disposed in the longitudinal direction, the second engagement member is disposed in the short direction. In this manner, the four side surfaces of the retainer can be engaged with the inner case and, thus, protrusion of the airbag can be effectively prevented.

Furthermore, by forming the engagement member as one of a hook and a holding belt, the retainer can be easily engaged with the inner case. In particular, when the holding belt is employed as the engagement member, the holding belt can be disposed between the retainer and the inner case and, thus, generation of abnormal noise can be prevented.

Still furthermore, by forming the holding belt serving as the engagement member from belt-like fabric, such as webbing, the weight of the retainer can be reduced. In addition, the retainer can be prevented from coming off.

Yet still furthermore, by using a rivet as fixing means of the holding belt and the retainer, the holding belt can be easily fixed from the outer side of the retainer.

Yet still furthermore, by fixing the holding belt to the raised portion of the retainer, the length of protrusion of the fixing member toward the inside of the retainer can be reduced and, thus, the inner space of the retainer can be effectively used. In addition, by forming a notch in the airbag cover, the fixing member does not interfere with the retainer when the retainer is fixed to the airbag cover. Accordingly, even when the raised portion is formed, a sufficient capacity of the inner space of the retainer can be obtained.

Yet still furthermore, by forming a resin retainer, the weight of the retainer can be reduced and can be easily molded. In addition, by separating the inflator fixing attachment hole and the bracket fixing attachment hole from each other and using the back plate that covers the two holes, the bottom surface portion of the retainer can be sandwiched. Accordingly, even when the retainer is made of resin, the inflator and the bracket can be easily fixed to the retainer.

BRIEF DESCRIPTION OF THE DRAWINGS

FIG. 4 illustrates a retainer of the airbag device illustrated in FIG. 1, wherein

FIG. 5 illustrates an airbag of the airbag device illustrated in FIG. 1 in an initial stage of inflation and deployment, wherein

FIG. 6 illustrates an airbag device according to a second embodiment of the present invention, wherein FIG. 6(A) is a cross-sectional view, and FIG. 6(B) is a back view.

FIG. 7 illustrates an airbag device according to a third embodiment of the present invention, wherein

FIG. 8 is a side view of the airbag device illustrated in FIG. 7, wherein

FIG. 9 illustrates a retainer of the airbag device illustrated in FIG. 7, wherein

DETAILED DESCRIPTION OF THE PREFERRED EMBODIMENTDS

Figure 1:
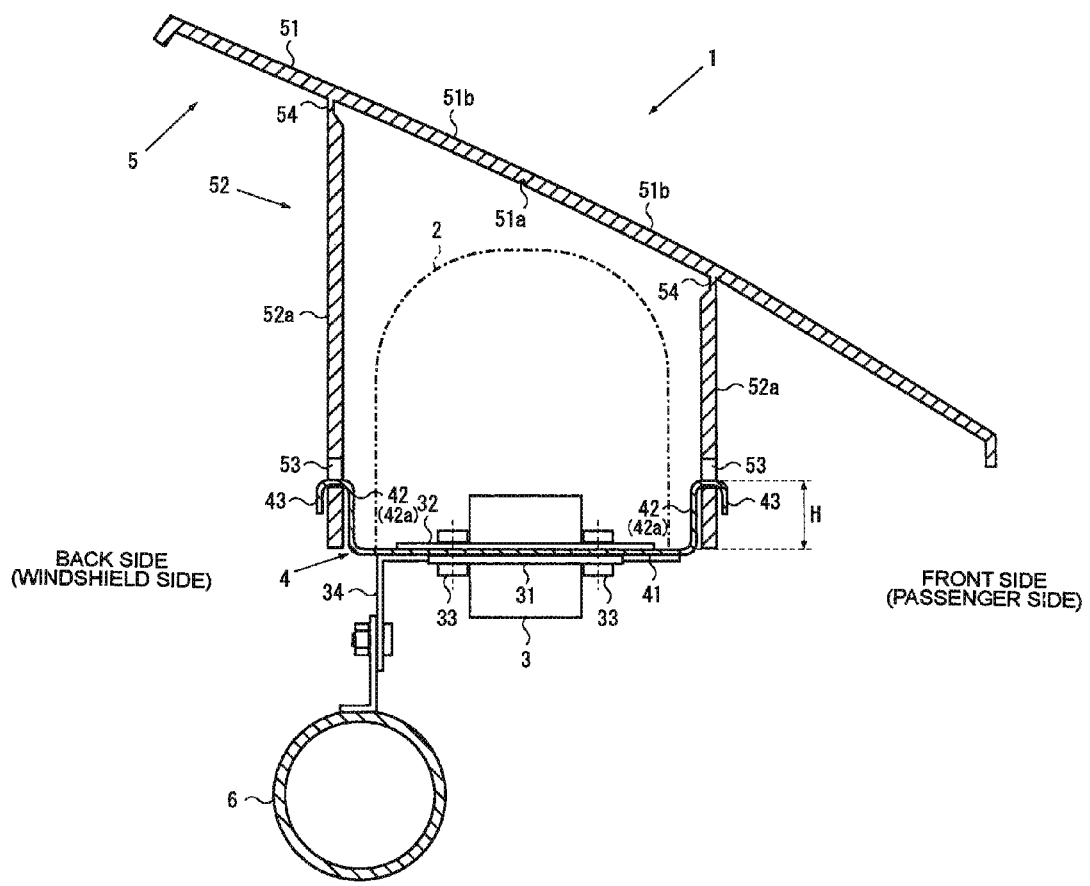
FIG. 1 is a cross-sectional view of an airbag device according to a first embodiment of the present invention.
Figure 2:
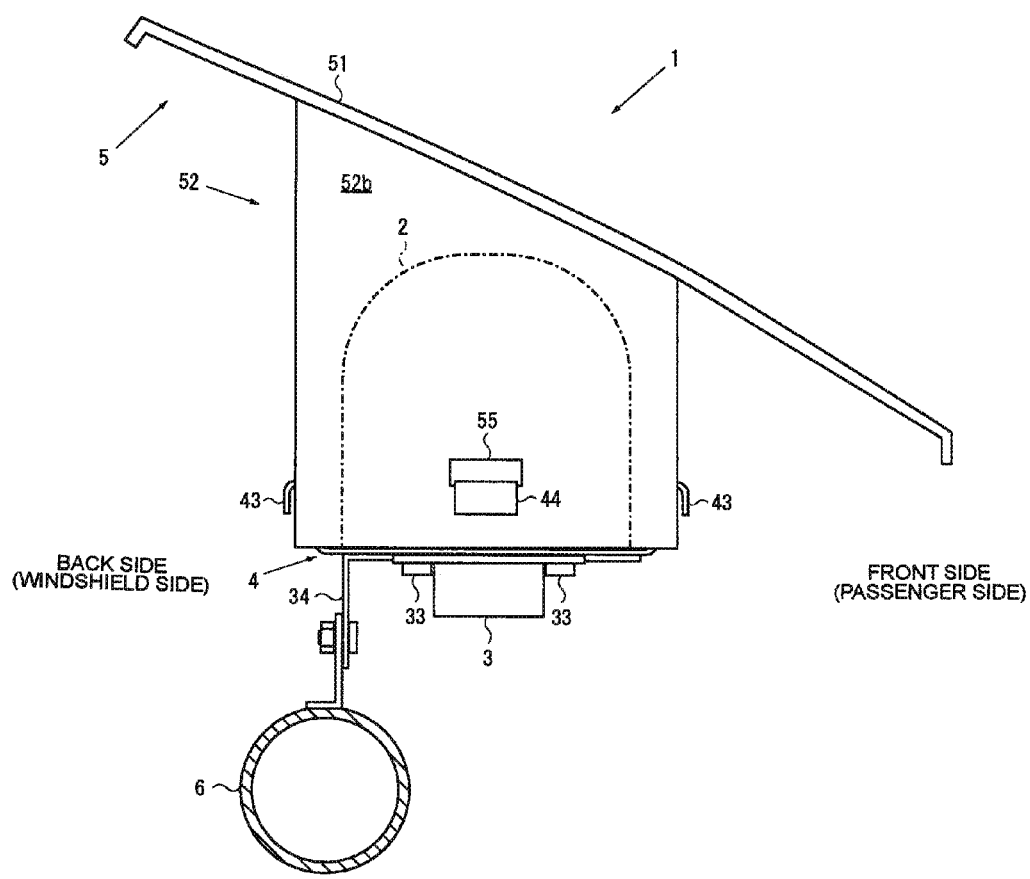
FIG. 2 is a side view of the airbag device illustrated in FIG. 1.
Figure 3:
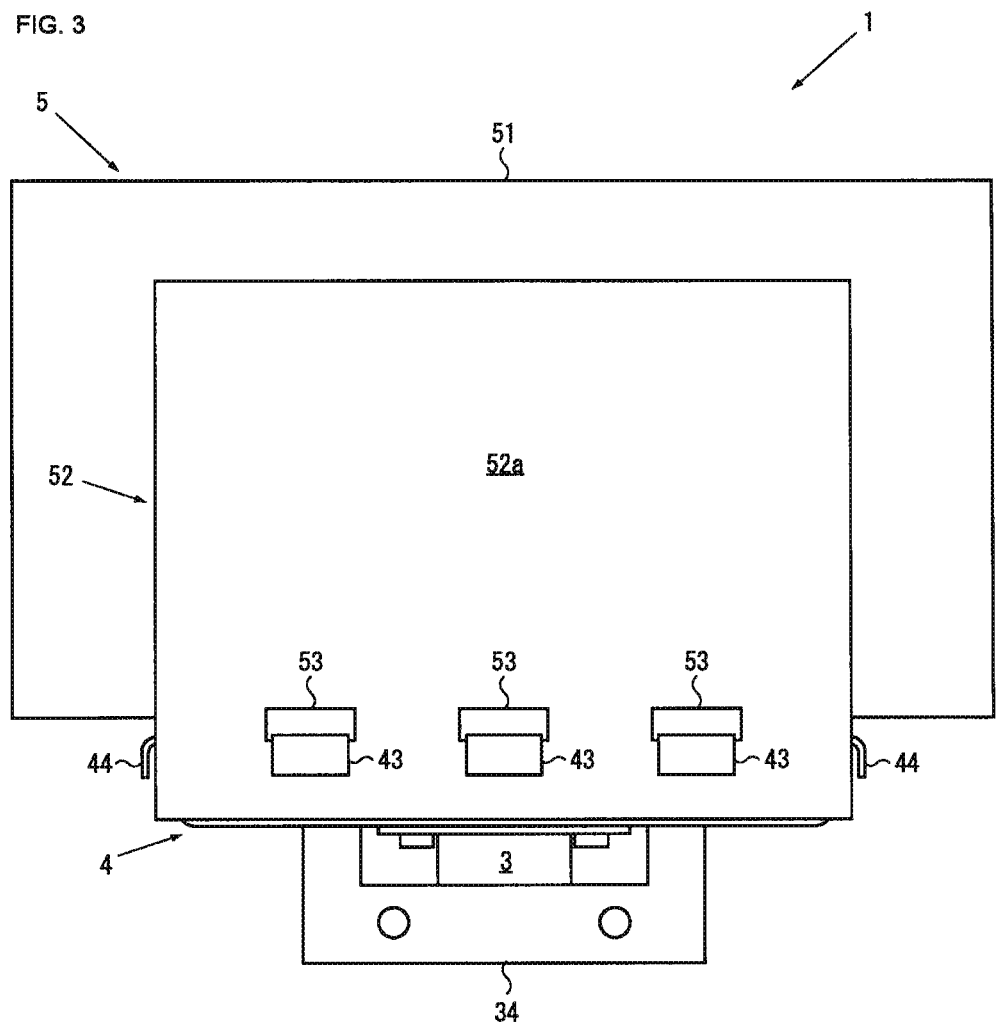
FIG. 3 is a back view of the airbag device illustrated in FIG. 1.

An airbag device according to an embodiment of the present invention is described below with reference to FIGS. 1 to 9. FIG. 1 is a cross-sectional view of an airbag device according to a first embodiment of the present invention. FIG. 2 is a side view of the airbag device illustrated in FIG. 1. FIG. 3 is a back view of the airbag device illustrated in FIG. 1. FIG.

Figure 4A:
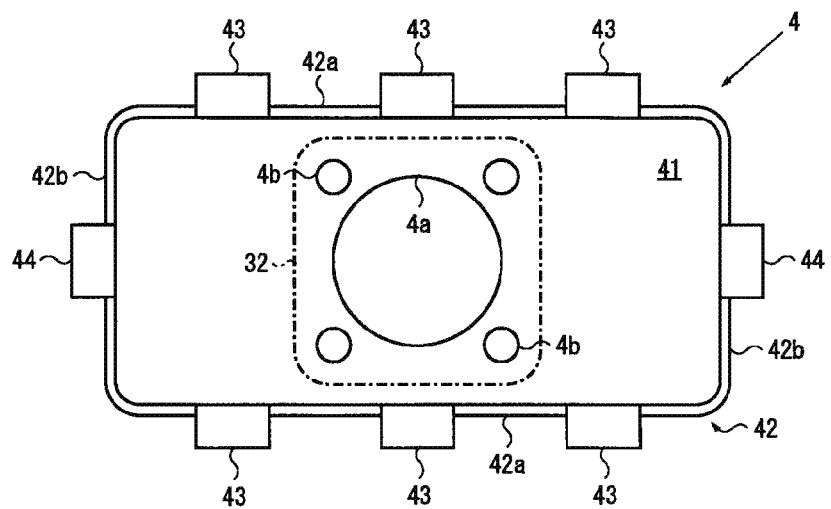
FIG. 4(A) is a plan view.
Figure 4B:
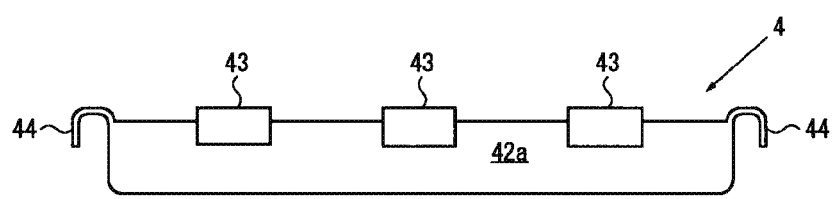
FIG. 4(B) is a front view.
Figure 4C:
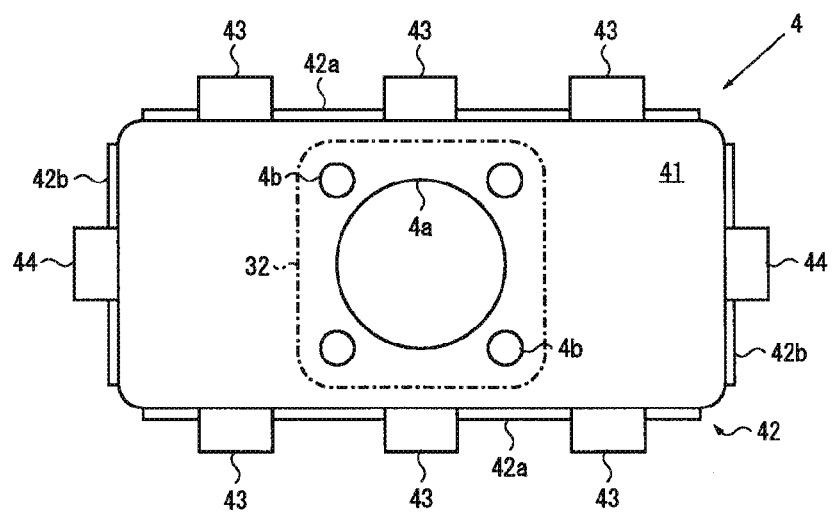
FIG. 4(C) is a plan view of a modification of the retainer.
Figure 4D:
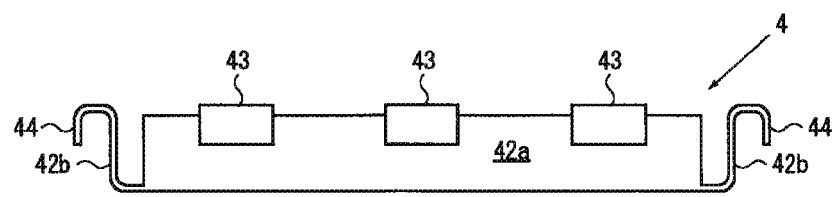
FIG. 4(D) is a front view of the modification.
Figure 5A:
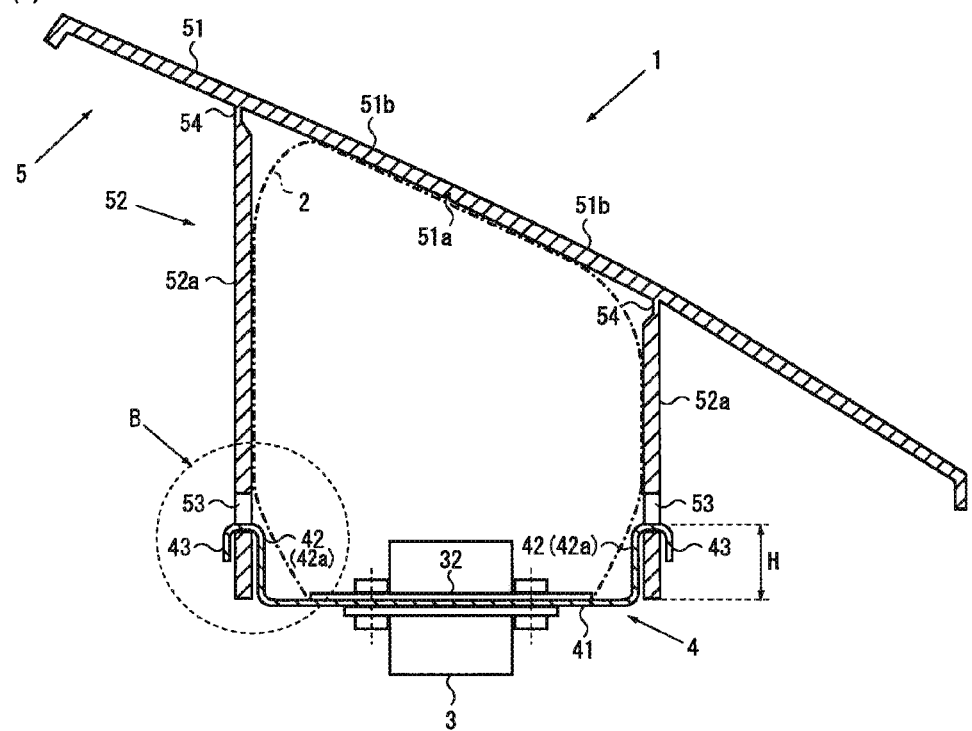
FIG. 5(A) is a cross-sectional view.
Figure 5B:
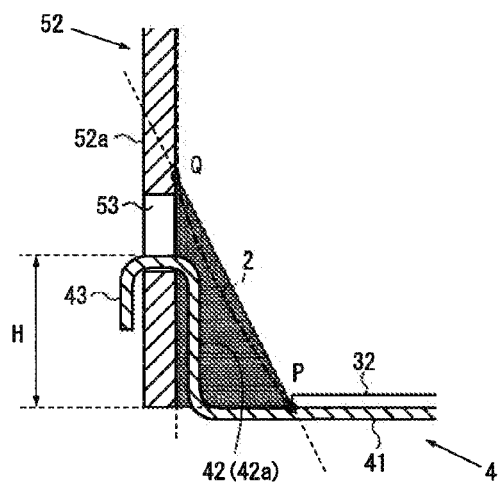
FIG. 5(B) is an enlarged view of a B portion illustrated in FIG. 4(A).

4 illustrates a retainer of the airbag device illustrated in FIG. 1, wherein FIG. 4(A) is a plan view, FIG. 4(B) is a front view, FIG. 4(C) is a plan view of a modification of the retainer, and FIG. 4(D) is a front view of the modification. FIG. 5 illustrates an airbag of the airbag device illustrated in FIG. 1 in an initial stage of inflation and deployment of the airbag, wherein FIG. 5(A) is a cross-sectional view, FIG. 5(B) is an enlarged view of a B portion illustrated in FIG. 4(A).

As illustrated in FIGS. 1 to 5, according to the first embodiment of the present invention, an airbag device 1 includes an airbag 2 that is normally folded and is inflated and deployed in emergency, an inflator 3 for supplying gas to the airbag 2, a retainer 4 for fixing the airbag 2 and the inflator 3, and an airbag cover 5 for housing the airbag 2. The airbag cover 5 includes a plate portion 51 that forms an interior surface of a vehicle and an inner case 52 that is disposed on the back surface of the plate portion 51 and that forms an inflation and deployment path of the airbag 2. The inner case 52 has a plurality of holding hole 53 for holding the retainer 4. The retainer 4 includes a bottom surface portion 41 that supports the airbag 2 and the inflator 3, a side wall portion 42 that is disposed at the outer periphery of the bottom surface portion 41 and that has a height H at which a pressure of the airbag 2 is hardly received when the airbag 2 is inflated and deployed, and engagement members 43 that are disposed on the side wall portion 42 and are engageable with the holding holes 53. The substantially entirety of retainer 4 is housed in the inner case 52 when the engagement members 43 are engaged with the holding holes 53.

The airbag device 1 is a passenger airbag device. The airbag device 1 is mounted on an instrument panel (not illustrated) disposed in front of a passenger seat. Accordingly, the front surface of the airbag cover 5 (the plate portion 51) forms part of the instrument panel and forms part of the interior surface of the vehicle. Note that in FIG. 1, the right direction indicates the front (a passenger side), and the left direction indicates the back (a windshield side).

The inflator 3 serves as a gas generator that generates gas to be supplied to the airbag 2. For example, the exterior shape of the inflator 3 is a substantially disc shape. The inflator 3 is fitted into an opening formed in the bottom surface portion 41 of the retainer 4. A flange portion 31 and a back plate 32 clamp the bottom surface portion 41 of the retainer 4 and, thereafter, the inflator 3 is fixed to the retainer 4 using a fastener 33, such as a bolt. In this example, the inflator 3 of a disk type is illustrated. Alternatively, the inflator 3 of a cylinder type having a substantially cylindrical shape may be employed.

The inflator 3 is connected to an electronic control unit (ECU) (not illustrated). The inflator 3 is controlled in accordance with a measurement value output from, for example, an acceleration sensor. If the ECU detects collision, a potential collision, sudden deceleration, or potential sudden deceleration of the vehicle, the inflator 3 is ignited by an ignition current from the ECU. Thus, the inflator 3 generates gas by burning a chemical agent that is stored inside of the inflator 3. In this manner, the inflator 3 supplies gas into the airbag 2.

The airbag 2 is clamped by the back plate 32 and the bottom surface portion 41 of the retainer 4 and is fixed to the retainer 4 by the fastener 33. As indicated by an alternate long and short dash line in FIG. 1, the airbag 2 is folded and is fixed to the retainer 4 at normal times. Note that in order to hold the airbag 2 in a folded state, wrapping cloth (not illustrated) that wraps up the folded airbag 2 may be disposed.

The airbag cover 5 is formed by molding the plate portion 51 and the inner case 52 in an integrated manner. The plate portion 51 and the inner case 52 may be molded in an integrated manner by injection molding. Alternatively, the plate portion 51 and the inner case 52 may be formed in an integrated manner by welding the inner case 52 on the back surface of the plate portion 51. Note that the structure and the shape of the airbag cover 5 are not limited to those illustrated. For example, existing structure and the shape in which the inner case 52 is substantially vertically disposed on the plate portion 51 may be employed as needed.

For example, the plate portion 51 is a member that forms part of the interior surface of the vehicle, such as the instrument panel. In an area inside the inner case 52 of the plate portion 51, a thin-walled tear line 51a is formed along a desired shape along which the plate portion 51 is torn when the airbag 2 is inflated and deployed. For example, the tear line 51a is formed into a substantially H shape. The plate portion 51 is torn into a pair of door portions 51b so that double doors swing open on hinges 54. Note that the tear line 51a may be formed into, for example, a substantially U shape so that a single door portion swings open.

The inner case 52 is formed by a rectangular tubular wall surface protruding from the back surface of the plate portion 51. In FIG. 1, among four surfaces that form the inner case 52, a pair of first wall surfaces 52a that face each other in the front-rear direction of the vehicle is illustrated. Each of the hinges 54 is formed by an articulated portion between the plate portion 51 and the inner case 52. As illustrated in FIG. 1, for example, the hinge 54 is formed from a partial thin-walled portion of the inner case 52. Note that when the inner case 52 is welded to the plate portion 51 and if the door portions 51b are open separately from the plate portion 51, the hinge portion may be formed as a substantially U shaped portion formed in the weld portion of the inner case 52.

As illustrated in FIGS. 1 and 3, the inner case 52 includes a plurality of the holding holes 53 for holding the retainer 4. Each of the first wall surfaces 52a that form the inner case 52 has three holding holes 53. Since the engagement member 43 is a thin-walled flat plate, the holding hole 53 is formed as, for example, a long hole extending in the right-left direction. In this example, the case in which the holding holes 53 are formed in the pair of first wall surfaces 52a that face each other in the substantially front-rear direction of the vehicle is illustrated. However, the holding holes 53 may be formed in a pair of wall surfaces that form the inner case 52 in the longitudinal direction. Note that when the airbag device 1 is a passenger airbag device, the pair of first wall surfaces 52a that face each other in a substantially front-rear direction of the vehicle corresponds to a pair of wall surfaces of the inner case 52 in the longitudinal direction, in general. By forming the holding holes 53 in such a pair of first wall surfaces 52a, the engagement member 43 can be easily disposed and, in addition, a force and a shock occurring when the airbag 2 is inflated and deployed can be effectively received.

As illustrated in FIG. 2, the inner case 52 has two supporting holes 55 each formed in one of two second wall surfaces 52b that face each other in the right-left direction of the vehicle. Each of the supporting hole 55 is an opening with which one of two second engagement members 44 formed on the retainer 4 is engaged. If the airbag device 1 is a passenger airbag device, the pair of the second wall surfaces 52b that face each other in a substantially right-left direction of the vehicle corresponds to a pair of wall surfaces of the inner case 52 in the short direction, in general. Note that according to the present embodiment, the supporting holes 55 are not essential component and, thus, the need for the supporting holes 55 may be eliminated together with the second engagement members 44.

As illustrated in FIGS. 4(A) and 4(B), the retainer 4 has a box shape with an open top. The side wall portion 42 includes a pair of first side wall portions 42a, 42a that form the side surfaces extending in the longitudinal direction and a pair of second side wall portions 42b, 42b that form the side surfaces extending in the short direction. If the airbag device 1 is a passenger airbag device, the first side wall portions 42a extending in the longitudinal direction form a pair of the wall surfaces that face each other in a substantially front-rear direction of the vehicle, in general. In addition, the second side wall portions 42b extending in the short direction form a pair of the wall surfaces that face each other in a substantially right-left direction of the vehicle. Accordingly, the first side wall portions 42a extending in the longitudinal direction face the first wall surfaces 52a of the inner case 52. The second side wall portions 42b extending in the short direction face the second wall surfaces 52b of the inner case 52. Like existing retainers, the retainer 4 may be formed of a metal material or a resin material.

In addition, as illustrated in FIG. 1, the inflator 3 and a bracket 34 are mounted on the bottom surface portion 41 of the retainer 4. The bracket 34 is a part for fixing the retainer 4 to an interior structure 6. Note that the structure and the shape of the bracket 34 are not limited to those illustrated in FIG. 1. The structure and the shape of the bracket 34 may be changed in accordance with conditions, such as the size and material of the retainer 4 and a positional relationship between the retainer 4 and the interior structure 6 connected to the retainer 4 as needed.

As illustrated in FIG. 4(A), the retainer 4 has an inflator insertion opening 4a formed in the bottom surface portion 41 and a plurality of inflator fixing attachment holes 4b formed at the outer periphery of the inflator insertion opening 4a. In FIG. 4(A), the retainer 4 is formed from, for example, a thin-walled metal plate. The bracket 34 is connected to the lower surface of the bottom surface portion 41 by welding. When the inflator 3 having a disc shape is employed, the inflator insertion opening 4a has a circular shape. In contrast, when an inflator having a cylindrical shape is employed, the inflator insertion opening 4a has a rectangular shape. The fasteners 33 for fixing the flange portion 31 and the back plate 32 of the inflator 3 are inserted into the inflator fixing attachment holes 4b (refer to FIG. 1). Note that in FIG. 4(A), for convenience of description, the outline of the back plate 32 is indicated by an alternate long and short dash line.

As illustrated in FIGS. 4(A) and 4(B), the engagement members 43 and the second engagement members 44 of the retainer 4 are formed from hooks. According to the present embodiment, the height of the side wall portion 42 (the first side wall portions 42a in which the engagement members 43 are disposed and the second side wall portions 42b in which the second engagement members 44 are disposed) is set to the height H so that the retainer 4 hardly receives the pressure of the airbag 2 when the airbag 2 is inflated and deployed. Thus, the opening in the top surface of the retainer 4 is hardly deformed and, therefore, so-called fish-mouth phenomenon can be prevented. As a result, the strength and the rigidity required for the retainer 4 can be reduced from those required for existing retainers. Consequently, the retainer 4 can be formed from a metal plate having a thickness smaller than that of a previously used metal plate. In addition, a load imposed on the engagement member 43 and the second engagement members 44 is lower than that imposed on existing retainers. Accordingly, the engagement member 43 and the second engagement member 44 can be formed integrally with the retainer 4 using the same material by, for example, bending and raising.

As indicated by a modification illustrated in FIGS. 4(C) and 4(D), the retainer 4 may have a shape with a gap between the first side wall portions 42a and the second side wall portions 42b. According to such a structure, the first side wall portions 42a and the second side wall portions 42b can be formed by simply bending a metal plate that forms the retainer 4. Thus, the processing of the retainer 4 can be facilitated.

The height H of the side wall portion 42 of the retainer 4 is described below with reference to FIG. 5. As illustrated in FIG. 5(A), in an initial stage of inflation and deployment of the airbag 2, the airbag 2 is inflated within the inner case 52 of the airbag cover 5. If a certain pressure is imposed on the plate portion 51, the airbag cover 5 is torn open along the tear line 51a. Thus, the door portions 51b are opened, and the airbag 2 is inflated into the interior of the vehicle. As illustrated in the drawing, when the airbag 2 is inflated within the inner case 52, a dead zone to which the airbag 2 does not reach appears at each of the corners of the inner case 52. According to the present embodiment, the height H is set so that the side wall portion 42 of the retainer 4 is located in such a dead zone.

More specifically, as illustrated in FIG. 5(B), the height H of the side wall portion 42 is set within a range in which the height H does not exceed a line segment PQ connecting a fixed point P of the airbag 2 located in the bottom surface portion 41 and a contact point Q of the airbag 2 at an inflation and deployment time and the inner case 52 (e.g., a shaded area in FIG. 5(B)). Since the airbag 2 is clamped by the bottom surface portion 41 of the retainer 4 and the back plate 32, the fixed point P is determined by the outer edge of the back plate 32. In addition, the contact point Q is determined by the lowermost end of the airbag 2 when the airbag 2 is inflated and deployed and is in contact with the pair of first wall surfaces 52a of the inner case 52. As illustrated in FIG. 5(B), in general, the airbag 2 is inflated so as to protrude downward beyond the line segment PQ. Accordingly, ideally, it is desirable that the height H of the side wall portion 42 be set so that the side wall portion 42 is not in contact with the airbag 2 protruding downward beyond the line segment PQ. However, if the side wall portion 42 is only in contact with the protruding portion, the side wall portion 42 does not receive such a high pressure that causes a fish-mouth phenomenon. Accordingly, it is only necessary that the height H of the side wall portion 42 be set within a range that does not exceed the line segment PQ.

Although the height H of the side wall portion 42 varies with, for example, the type and capacity of the airbag 2 and the shape of the inner case 52, the height H is not greater than about 60 mm, in general. By setting the height H to about 20 to 45 mm, the function of the retainer 4 can be maintained. In addition, when the airbag 2 is inflated and deployed, the pressure of the airbag 2 is hardly received.

In addition, as illustrated in FIGS. 5(A) and 5(B), the retainer 4 is configured so that the substantially entirety of the retainer 4 is housed in the inner case 52 when the engagement members 43 are engaged with the holding holes 53. As used herein, the term "substantially entirety" refers to 80 to 100% of the side wall portion 42 (the first side wall portions 42a and the second side wall portions 42b) being covered and, more preferably, about 90 to 98% of the side wall portion 42 being covered. In this manner, by covering more than or equal to 80% of the side wall portion 42 with the wall surface of the inner case 52 (the first wall surface 52a and the second wall surface 52b), a sufficient overlapping area can be obtained even when the wall surface of the inner case 52 (the first wall surface 52a and the second wall surface 52b) is deformed outwardly due to inflation and deployment of the airbag 2. Thus, a gap is hardly formed between the retainer 4 and the inner case 52, and protrusion of the airbag 2 can be prevented.

Figure 7A:
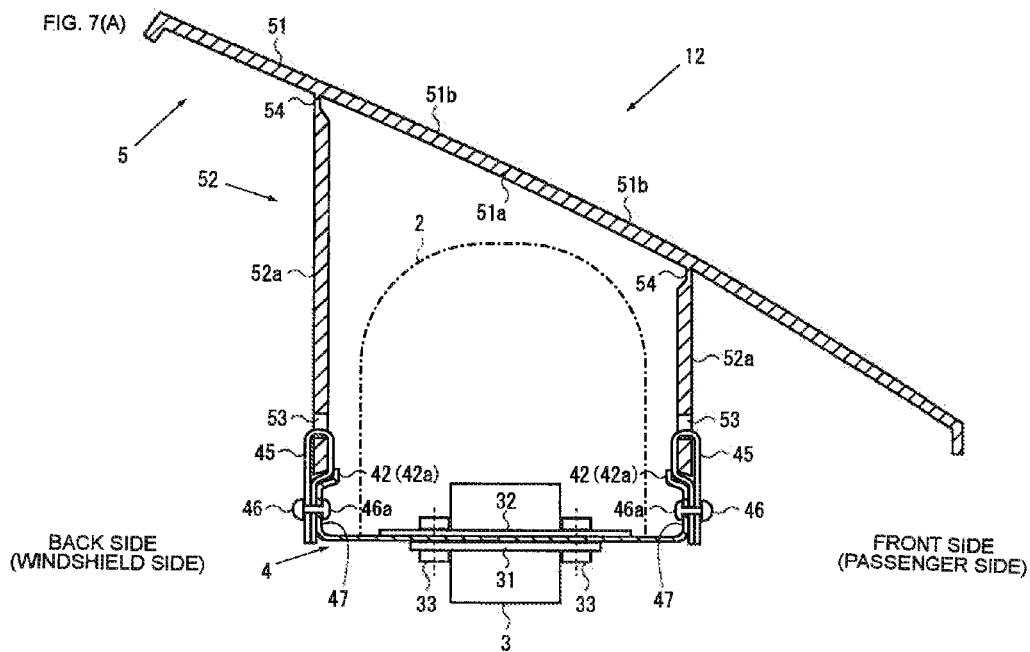
FIG. 7(A) is a cross-sectional view.
Figure 7B:
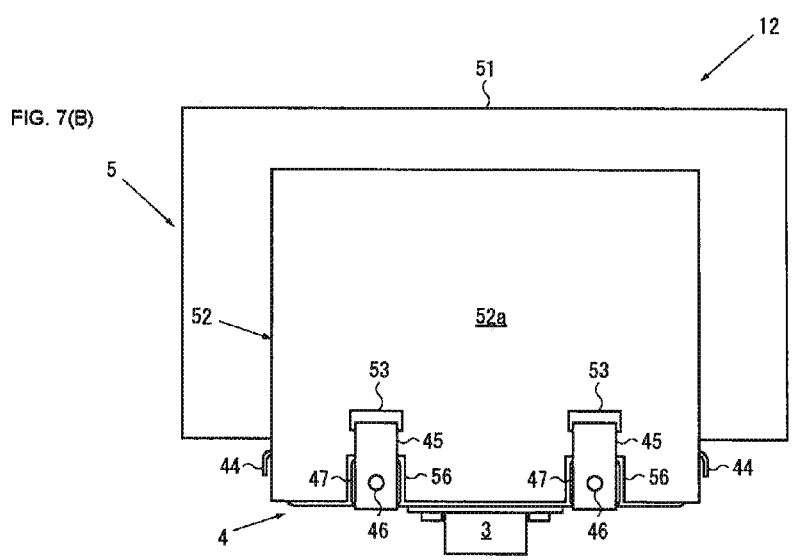
FIG. 7(B) is a back view.
Figure 8A:
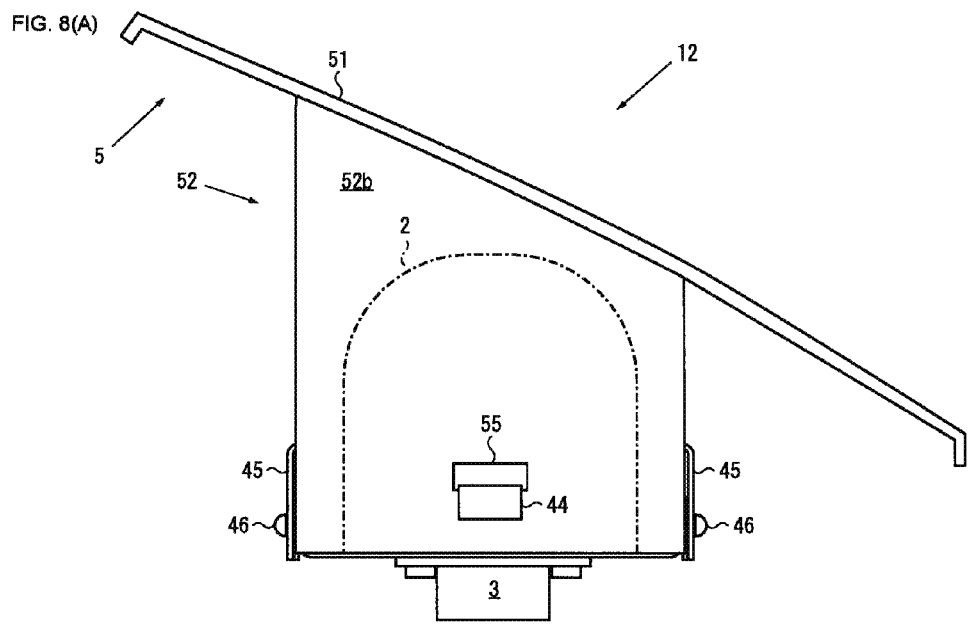
FIG. 8(A) illustrates a third embodiment.
Figure 8B:
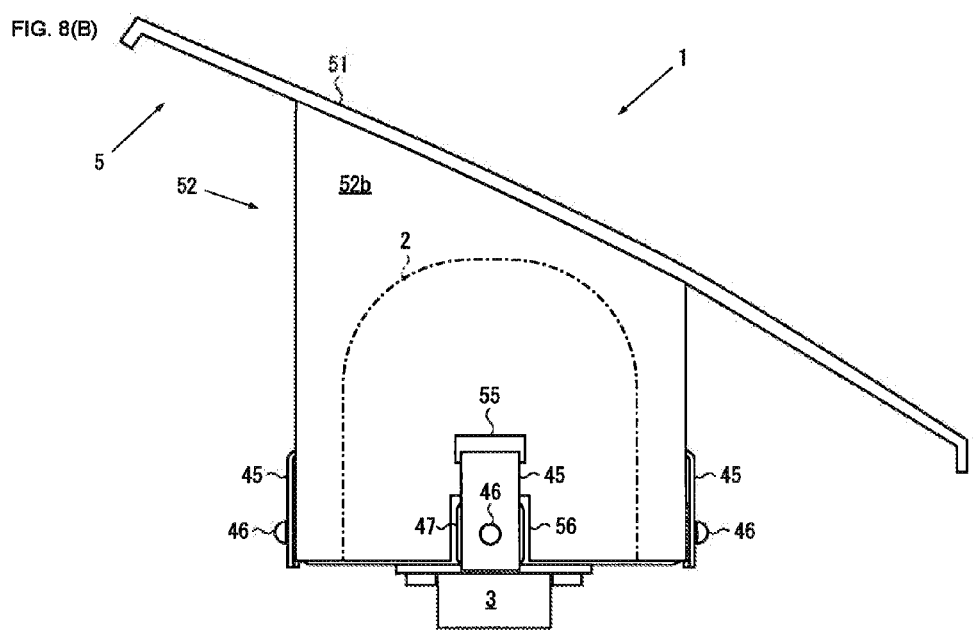
FIG. 8(B) illustrates a modification.
Figure 9A:
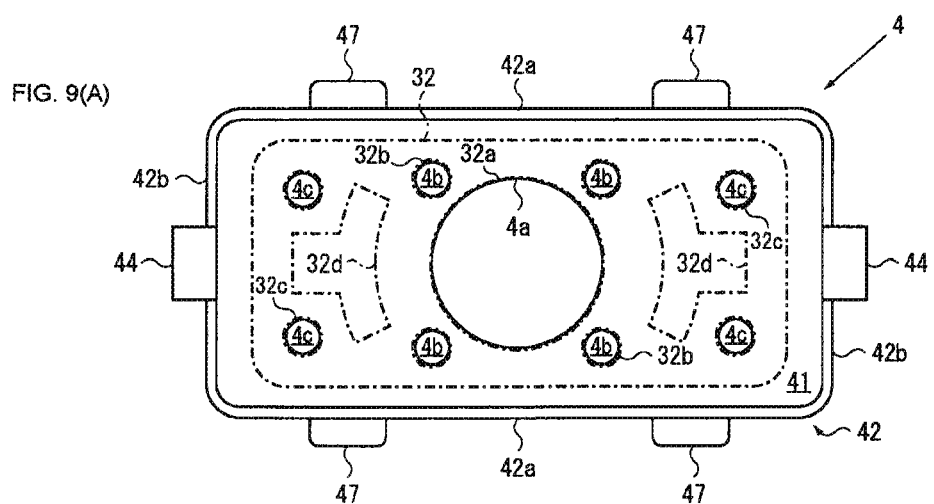
FIG. 9(A) is a plan view.
Figure 9B:
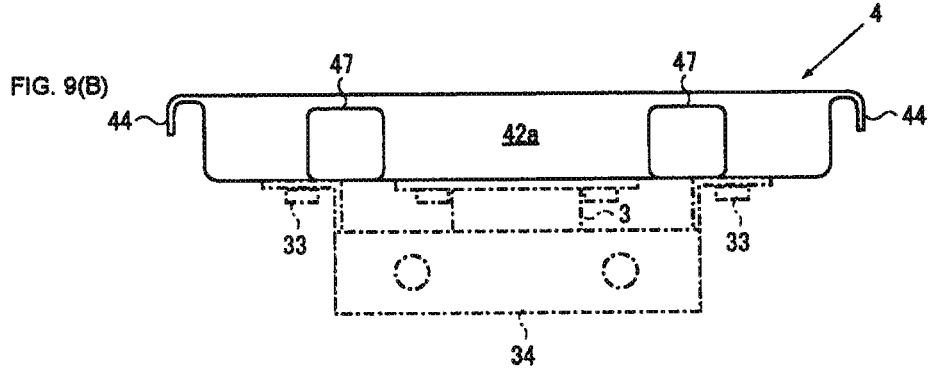
FIG. 9(B) is a front view.

An airbag device according to another embodiment of the present invention is described below. FIG. 6 illustrates an airbag device according to a second embodiment of the present invention, wherein FIG. 6(A) is a cross-sectional view, and FIG. 6(B) is a back view. FIG. 7 illustrates an airbag device according to a third embodiment of the present invention, wherein FIG. 7(A) is a cross-sectional view, and FIG. 7(B) is a back view. FIG. 8 is a side view of the airbag device illustrated in FIG. 7, wherein FIG. 8(A) illustrates the third embodiment, and FIG. 8(B) illustrates a modification. FIG. 9 illustrates a retainer of the airbag device illustrated in FIG. 7, wherein FIG. 9(A) is a plan view, and FIG. 9(B) is a front view. Note that in the drawings, the same reference numerals are used to identify components having the same structure as the airbag device 1 according to the first embodiment illustrated in FIGS. 1 to 5, and descriptions of the components are not repeated. In addition, in FIGS. 6 to 8, the bracket 34 and the interior structure 6 are not illustrated.

As illustrated in FIG. 6, according to the second embodiment, an airbag device 11 includes the engagement member 43 formed from a holding belt 45 that is inserted into the holding hole 53, is formed into a ring shape, and is connected to the retainer 4. As illustrated in FIGS. 6(A) and 6(B), the holding belt 45 is fixed to the first side wall portions 42a of the retainer 4. For example, the holding belt 45 is formed from a high-strength belt-like woven, such as webbing used for sheet belts. By using webbing for the holding belt 45 in this manner, a holding belt having such strength that it can endure inflation and deployment of the airbag 2 can be easily obtained.

In particular, since the holding belt 45 having a length of 10 to 30 cm is sufficient and, in addition, the holding belt 45 is not viewable by an occupant, a tag of webbing or a defective webbing (e.g., the holding belt 45 with bad looking or ragged end) generated in the manufacturing step of a seat belt device can be used as the holding belt 45. Thus, an amount of waste material can be reduced.

Note that the material of the holding belt 45 is not limited to webbing. Any belt-like woven having such strength that it can endure the force and a shock caused by inflation and deployment of the airbag 2 may be used as the holding belt 45. As used herein, the term "belt-like woven" refers to webbing having a cord width to a wide width (not greater than the width of the first side wall portions 42a of the retainer 4). The belt-like woven may be formed by combining a plurality of cord members into a belt-like member. Furthermore, the width of the holding belt 45 and the number of the holding belts 45 are not limited to those illustrated in the drawing, but may be changed in accordance with, for example, the strength of the material and the tension applied.

As illustrated in FIG. 6(A), the holding belt 45 is inserted into the holding hole 53. Both the ends of the belt-like fabric are overlapped each other into a circular shape (a ring or a loop) and, thereafter, are fixed to the first side wall portions 42a of the retainer 4 using a rivet 46 punched from the outside. By fixing the holding belt 45 to the retainer 4 using a rivet as fixing means in this manner, the holding belt 45 can be easily fixed to the retainer 4 from the outside of the retainer 4. Note that the fixing means of the holding belt 45 is not limited to the rivet 46. A variety of fixing means, such as bolt/nut, sewing, welding, or an adhesive agent, can be employed as needed.

In addition, as illustrated in FIG. 6(B), the inner case 52 has a notch 56. Since the substantially entirety of the retainer 4 is housed in the inner case 52, the notch 56 is formed to expose the surface to which the rivet 46 is to be punched.

Since the retainer 4 is fixed to the inner case 52 (the airbag cover 5) using the holding belt 45 in the above-described manner, the need for a high-strength metal material, such as a hook used in existing retainers, is eliminated. Thus, the weight of the airbag device 11 can be reduced. In addition, by inserting the holding belt 45 into the holding hole 53 and connecting both the ends into a ring shape, an engagement state of the holding belt 45 can be maintained even when the inner case 52 is deformed during inflation and deployment of the airbag 2, unless the holding belt 45 or the inner case 52 fractures. Thus, the holding belt 45 is prevented from being disengaged from the holding hole 53. Furthermore, as illustrated in FIG. 6(A), by disposing the holding belt 45 made of a material that is softer than a metal material between the retainer 4 and the airbag cover 5 (the inner case 52), generation of abnormal noise can be prevented even when the retainer 4 is in contact with the airbag cover 5 (the inner case 52). Thus, discomfort experienced by the occupant can be reduced.

In addition, like the retainer 4 illustrated in FIG. 4, the retainer 4 includes a hook-shaped second engagement member 44. Such a second engagement member 44 hardly generate a gap between the retainer 4 and the inner case 52 when the airbag 2 is inflated and deployed. Furthermore, the second engagement members 44 can be used to temporarily fix the retainer 4 to the inner case 52 when the retainer 4 is riveted to the inner case 52.

As illustrated in FIG. 7, an airbag device 12 according to the third embodiment includes the engagement member 43 formed from the holding belt 45 and the retainer 4 having a fixing portion for the holding belt 45. The fixing portion includes a raised portion 47 that expands outwardly so that part of a fixing member (the rivet 46) for the holding belt 45 does not protrude inwardly beyond the side surface portion (the first side wall portion 42a) on which the fixing portion is disposed.

More specifically, as illustrated in FIGS. 7 and 9, the raised portion 47 is formed so that part of the first side wall portion 42a of the retainer 4 expands outwardly, and a space protruding outwardly is formed. A top end of the fixing member (e.g., the rivet 46) is inserted into the space formed inside the raised portion 47. As a result, the top end of the fixing member (e.g., an internal head portion 46a of the rivet 46) does not protrude inwardly beyond the first side wall portion 42a.

Accordingly, by fixing the holding belt 45 to the raised portion 47 of the retainer 4, a length of protrusion of the fixing member into the inside of the retainer 4 can be reduced. Thus, the fixing member (e.g., the rivet 46) does not disturb a storing operation of the airbag 2 and inflation and deployment of the airbag 2. As a result, the internal space of the retainer 4 can be effectively used. While the present embodiments have been described with reference to the raised portion 47 formed for each of the fixing portion for the holding belt 45, the raised portion 47 may be extended in the right-left direction so that a plurality of fixing portions can be formed therein.

In addition, as illustrated in FIG. 7(B), the inner case 52 has a notch 56. The notch 56 is formed so that the inner case 52 does not interfere with the raised portion 47. By forming the notch 56 having such a structure, the airbag cover 5 does not interfere with the raised portion 47 when the retainer 4 is fixed to the airbag cover 5. Even when the raised portion 47 is formed, a sufficient capacity of the space inside the retainer 4 can be obtained. In this manner, the substantially entirety of the retainer 4 can be housed in the inner case 52.

Furthermore, as illustrated in FIG. 8(A), the retainer 4 includes the hook-like second engagement members 44 that is engageable with the supporting holes 55 formed in the inner case 52. The second engagement members 44 having such a structure hardly form a gap between the retainer 4 and the inner case 52 when the airbag 2 is inflated and deployed. In addition, the second engagement members 44 can be used to temporarily fix the retainer 4 to the inner case 52 when the retainer 4 is riveted to the inner case 52.

A technique for fixing the holding belt 45 is described below. One end of the holding belt 45 is inserted into the holding hole 53 of the inner case 52. Both the ends of the holding belt 45 are overlapped each other into a circular shape (a ring or a loop). Thereafter, in order to maintain such a shape, both the ends are temporarily jointed. At that time, for example, a pin, a suture thread, or an adhesive agent can be used.

Subsequently, the retainer 4 is pushed into the inner case 52, and the second engagement members 44 of the retainer 4 are engaged with the supporting holes 55 of the inner case 52. At that time, the raised portion 47 is inserted into the notch 56 of the inner case 52. By engaging the second engagement members 44 with the supporting holes 55 in this manner, the retainer 4 can be temporarily supported by the inner case 52. Accordingly, even when a worker does not hold the retainer 4, the retainer 4 does not come apart from the inner case 52. Thus, the workability can be increased. In addition, since the holding belt 45 is disposed between the retainer 4 and the inner case 52, the holding belt 45 functions as a slider. Thus, the retainer 4 can be smoothly inserted into the inner case 52.

Thereafter, both the ends of the holding belt 45 that are temporarily joined are urged against the raised portion 47 of the retainer 4 that is temporarily joined to the inner case 52 and are fixed to the retainer 4 from the outside using the rivet 46. A blind rivet that can be processed from one side can be used as the rivet 46.

Note that the above-described technique for fixing the holding belt 45 is only an example. The technique of the present invention is not limited thereto. For example, if the need for the second engagement member 44 and the supporting hole 55 is eliminated, the retainer 4 may be temporarily joined to the airbag cover 5 by the worker or using a fixing jig. Alternatively, one end of the holding belt 45 may be temporarily joined to the retainer 4 and, thereafter, the other end is inserted into the holding hole 53. Both the ends of the holding belt 45 may be overlapped each other and may be riveted together.

Alternatively, as indicated by the modification illustrated in FIG. 8(B), the second engagement member 44 may be formed from the holding belt 45 that is similar to the engagement member 43. In such a modification, the raised portion 47 is formed in the second side wall portion 42b of the retainer 4, and the holding belt 45 is fixed to the raised portion 47 by the rivet 46. In addition, the notch 56 is formed in the second wall surfaces 52b of the inner case 52 in order to prevent interference with the raised portion 47.

In the above-described airbag device 12 according to the third embodiment, the retainer 4 may be formed of resin. As illustrated in FIG. 9(A), if the retainer 4 is formed of resin, the retainer 4 may include the inflator insertion opening 4a formed in the bottom surface portion 41, a plurality of inflator fixing attachment holes 4b formed at the outer periphery of the inflator insertion opening 4a, and a plurality of bracket fixing attachment holes 4c formed outside the inflator fixing attachment holes 4b. The back plate 32 having an inflator insertion opening 32a, inflator fixing attachment holes 32b, and bracket fixing attachment holes 32c may be disposed on the inner surface of the bottom surface portion 41. By connecting the back plate 32 to the inflator 3 and the bracket 34, the bottom surface portion 41 is clamped. In this manner, the inflator 3 and the bracket 34 may be fixed to the retainer 4.

If the retainer 4 is made of resin, the bracket 34 cannot be welded to the retainer 4. Accordingly, if a fastener, such as a bolt, is used, a problem of the strength of the retainer 4 arises. Therefore, the back plate 32 made of metal having such a size that covers the inflator fixing attachment holes 4b and the bracket fixing attachment holes 4c is provided. In this manner, the back plate 32 can be firmly fixed to the bracket 34 using the fastener 33, such as a bolt. In order to reduce the weight of the bracket 34, the bracket 34 may have weight reducing holes 32d. Note that in FIGS. 9(A) and 9(B), for convenience of description, the outlines of the back plate 32, the inflator 3, and the bracket 34 are indicated by alternate long and short dash lines.

While above embodiments of the present invention have been described with reference to a passenger airbag device, the embodiments may be applied to any airbag device having a similar structure, such as a driver airbag device, a side airbag device, a curtain airbag device, a knee airbag device, and a pedestrian airbag device.

The present invention is not limited to the above-described embodiments. It should be understood that a variety of modifications can be made without departing from the scope of the present invention. For example, the shape of the retainer 4 made of resin illustrated in FIG. 9 may be changed as needed and may be applied to the airbag device 1 of the first embodiment or the airbag device 11 of the second embodiment.

The invention claimed is:

1. An airbag device comprising:
an airbag that is normally folded and is inflated and deployed in emergency;
an inflator for supplying gas to the airbag;
a retainer for fixing the airbag and the inflator; and
an airbag cover for housing the airbag,
wherein the airbag cover includes a plate portion that forms an interior surface of a vehicle and an inner case that is disposed on a back surface of the plate portion and that forms an inflation and deployment path of the airbag,
wherein the inner case has a plurality of holding holes for holding the retainer,
wherein the retainer has a bottom surface portion for supporting the airbag and the inflator, a side wall portion that is disposed at an outer periphery of the bottom surface portion and that has such a height that the bottom surface portion hardly receives a pressure of the airbag when the airbag is inflated and deployed, and engagement members that are disposed on the side wall portion and that are engageable with the holding holes,
wherein a substantially entirety of the retainer is housed in the inner case when the engagement members are engaged with the holding holes, and
the height of the side wall portion is set within a range in which the height does not exceed an upper end point of a line segment connecting a fixed point of the airbag located on the bottom surface portion corresponding to a lower end point of the line segment and a contact point of the airbag against the inner case corresponding to the line segment upper end point during inflation and deployment of the airbag.

2. The airbag device according to claim 1, wherein the holding holes are formed in each of two wall surfaces that face each other in a substantially front-rear direction of the vehicle or each of two wall surfaces that form the inner case in the longitudinal direction,
wherein the inner case has a supporting hole formed in each of two wall surfaces that face each other in a substantially right-left direction of the vehicle or each of two wall surfaces that form the inner case in the short direction, and wherein the retainer includes a second engagement member that is engageable with the supporting holes and is separate from the engagement members that are for being engaged with the holding holes.

3. The airbag device according to claim 1, wherein the engagement member is a holding belt formed in a circular shape by being inserted into a hook formed in the retainer or the holding hole and being connected to the retainer.

4. The airbag device according to claim 3, wherein the holding belt is formed from one of webbing that is used for a seat belt and a belt-like fabric having such strength that the fabric withstands a force and a shock generated when the airbag is inflated and deployed.

5. The airbag device according to claim 3, wherein the holding belt is fixed to the retainer from the outside by using a rivet.

6. The airbag device according to claim 5, wherein a fixing portion of the retainer for fixing the holding belt includes a raised portion that expands outwardly so that part of a fixing member for fixing the holding belt does not protrude inwardly beyond the side surface portion on which the fixing portion is disposed.

7. The airbag device according to claim 6, wherein the inner case has a notch formed so as not to interfere with the raised portion.

8. The airbag device according to claim 1, wherein the retainer is formed of resin.

9. The airbag device according to claim 8, wherein the airbag device has a back plate to fix the airbag to the retainer and a bracket to fix the retainer to the vehicle,
   wherein the retainer has an inflator insertion opening formed in the bottom surface portion, a plurality of inflator fixing attachment holes formed at the outer periphery of the inflator insertion opening, and a plurality of bracket fixing attachment holes formed outside the inflator fixing attachment holes,
   wherein the inflator and the bracket are fixed to the retainer by connecting the inflator and the bracket to the back plate so that the bottom surface portion is clamped.

\* \* \* \* \*